Dec. 15, 1925.
F. W. GILLMORE
1,566,205
WHEEL AND RIM
Filed May 28, 1925
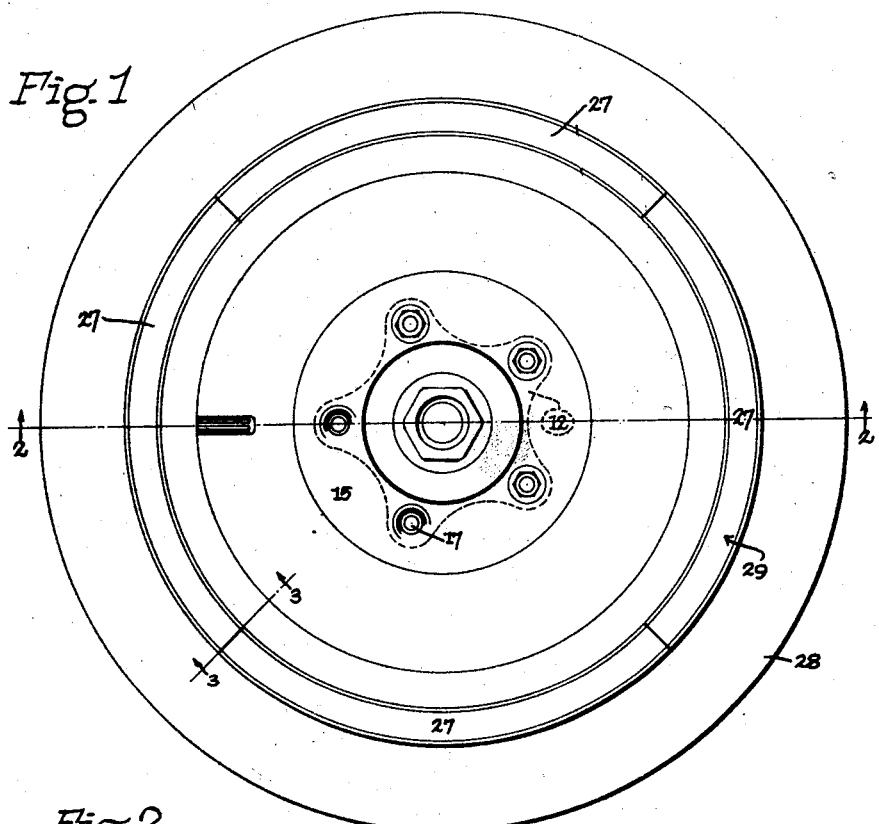
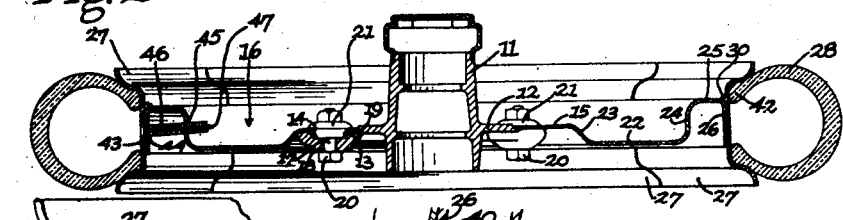
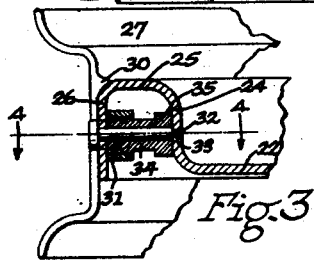
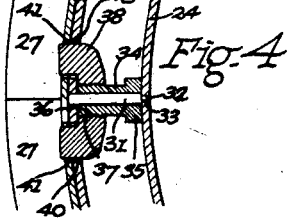
Inventor
Frank W. Gillmore
By Smith and Freeman
Attorney Patented Dec. 15, 1925.

1,566,205

UNITED STATES PATENT OFFICE.

FRANK W. GILLMORE, OF LORAIN, OHIO.

WHEEL AND RIM.

Application filed May 28, 1925. Serial No. 33,444.

*To all whom it may concern:*

Be it known that I, FRANK W. GILLMORE, a citizen of the United States of America, and a resident of Lorain, in the county of Lorain and State of Ohio, have invented certain new and useful Improvements in Wheels and Rims, of which the following is a full, clear, and exact description.

At the present time a constantly increasing number of automobiles are being equipped with disc wheels. In spite of this, however, various features of the disc wheels heretofore constructed have rendered these wheels appreciably unsatisfactory and have retarded the wider use of the disc wheel. My invention provides a wheel free from these objections and a rim particularly designed for use with this wheel. In the drawings accompanying this specification and forming a part thereof I have shown, for purposes of illustration, one form which my invention may assume.

In these drawings:

Figure 1 is a front elevation of this illustrative embodiment of my invention,

Figure 2 is a section on the line 2—2 of Figure 1,

Figure 3 is a section on the line 3—3 of Figure 1, while

Figure 4 is a section on the line 4—4 of Figure 3.

The wheel herein shown comprises a hub 11 generally similar to the hubs now in use for demountable wheels but having a flange 12 provided with a plurality of recesses 13 each adapted to receive one of the projections 14 carried by the inner band 15 of the disc 16 which forms the body of the wheel and is arranged to be secured to the hub 11 by means providing unusual resistance to shear and herein shown as bolts 17 passing through apertures 18 and 19 in the recesses 13 and projections 14 and arranged to firmly clamp the flange 12 and disc 16 between bolt heads 20 engaging the rear face of the recesses 13 and nuts 21 formed to closely engage the rear face of the projections 14. Exteriorly of the band 15 the disc 16 comprises a band 22 extending the greater part of the distance between the flange 12 and the periphery of the wheel, disposed in a plane parallel to and rearwardly of the median plane of the wheel in which the band 15 is situated, connected to the band 15 by an intermediate curved section 23, and connected, by means of a cylindrical section 24 and a section 25 substantially parallel to the median plane of the wheel and in advance thereof, to a cylindrical felloe portion 26 adapted to receive the tire rim and integral with the disc 16.

The tire rim herein shown comprises a plurality of sections 27 adapted to be placed end to end upon the rim engaging portions of the tire 28 to form a complete rim 29 on which the tire 28 is mounted. This rim 29, and the tire carried thereby, is then adapted to be placed upon the felloe 26 in the usual manner and is limited in its inward movement by engagement of the shoulder 30 on the rim 29 with the outer corner of the felloe 26 formed by the junction of the felloe 26 and the band 25. The rim 29 is then adapted to be secured in this assembled position by means of a plurality of securing means each herein shown as comprising a pin 31 extending between the felloe 26 and cylindrical section 24, secured in position by means of a reduced extension 32 passing through an aperture 33 in the cylindrical section 24 and headed, and arranged to rotatably support a bolt 34 extending between the felloe 26 and the cylindrical section 24, provided with a head 35 by means of which it may be rotated, and provided with a threaded section 36 adapted to engage a cooperating threaded section 37 formed on the central aperture of a member 38 provided with a pair of spaced prongs 39 each extending through apertures 40 in the felloe 26 and adapted to be advanced, by rotation of the nut 34, into position extending through apertures 41 in the abutting ends of adjacent rim sections 27 to thus function, either alone because of its angle of engagement with the rim sections, or in cooperation with the inextensible bead portions 42 of the tire 28, to hold the rim sections 27 assembled into the complete rim 29 and to at the same time hold the rim 29 firmly in position upon the felloe 26.

The rim 29, felloe 26, and cylindrical section 24 are provided with apertures 43, 44, and 45, respectively, arranged to permit the passage therethrough of the tire valve stem 46 and to cooperate therewith to readily aline the rim 29 circumferentially of the felloe 26 to permit the prongs 39 to readily enter the apertures 41, and the band 25 is formed of a width appreciably less than the length of the valve stem 46 whereby the tip 47 of the valve stem 46 is disposed within the space forward of the band 22 readily accessible from the front of the wheel and without the necessity of any local deformations or interruptions in the disc.

It will be obvious from the above description that various features of this wheel may be used other than with the particular rim herein shown, that the rim herein shown may be used with wheels other than that herein shown, that the rim and wheel herein shown effectively cooperate to fulfill the principal object of my invention, and that the particular embodiment of my invention herein shown and described may be variously changed and modified without departing from the spirit of my invention or sacrificing the advantages thereof. It will therefore be understood that this disclosure is illustrative only and that my invention is not limited thereto.

I claim:

1. A disc wheel wherein the portion of the body of the wheel lying between a cylinder coaxial with said wheel and of greater radius than the tip of the valve stem of the tire and a cylinder coaxial with said wheel and adjacent the inner edge of said disc, consists of an annular band disposed rearwardly of and substantially parallel to the median plane of said wheel, whereby said tip is made available from the front of said wheel without local deformation or interruption of said disc.

2. A disc wheel comprising a cylindrical rim supporting felloe portion integral with the disc body of the wheel and a body portion substantially parallel to the median plane of said wheel but rearwardly thereof and connected to said felloe portion by a portion substantially parallel to said felloe portion and a portion substantially parallel to said body portion.

3. A disc wheel comprising an annular band substantially parallel to the median plane of the wheel and extending from a radius less than that of the tip of the valve stem of the tire to a radius greater than that of the tip of the valve stem of the tire and disposed rearwardly of the median plane of the tire, and a cylindrical rim supporting felloe portion integral with the disc body of the wheel and connected to said body portion by a portion substantially parallel to said body portion and a portion substantially parallel to said felloe portion.

4. A disc wheel wherein the portion of the body of the wheel lying between a cylinder coaxial with said wheel and of greater radius than the tip of the valve stem of the tire and a cylinder coaxial with said wheel and of less radius than that of the tip of the valve stem of the tire, consists of an annular band disposed rearwardly of and substantially parallel to the median plane of said wheel, whereby said tip is made available from the front of said wheel without local deformation or interruption of said disc.

5. A disc wheel comprising an annular band substantially parallel to the median plane of the wheel and extending from a radius less than that of the tip of the valve stem of the tire to a radius greater than that of the tip of the valve stem of the tire and disposed rearwardly of the median plane of the tire, and a cylindrical rim supporting felloe portion integral with the disc body of the wheel.

In testimony whereof I hereunto affix my signature.

FRANK W. GILLMORE.